Oct. 17, 1933.  M. F. FITZGERALD  1,931,345
TIMED ELECTRIC TOASTER
Filed Sept. 17, 1930  3 Sheets-Sheet 1
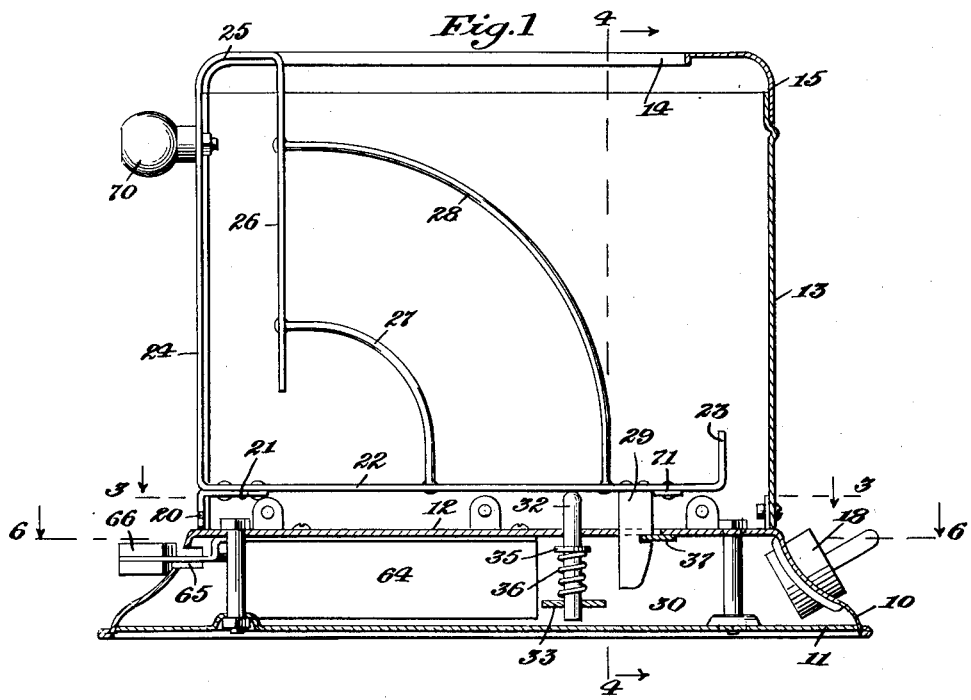
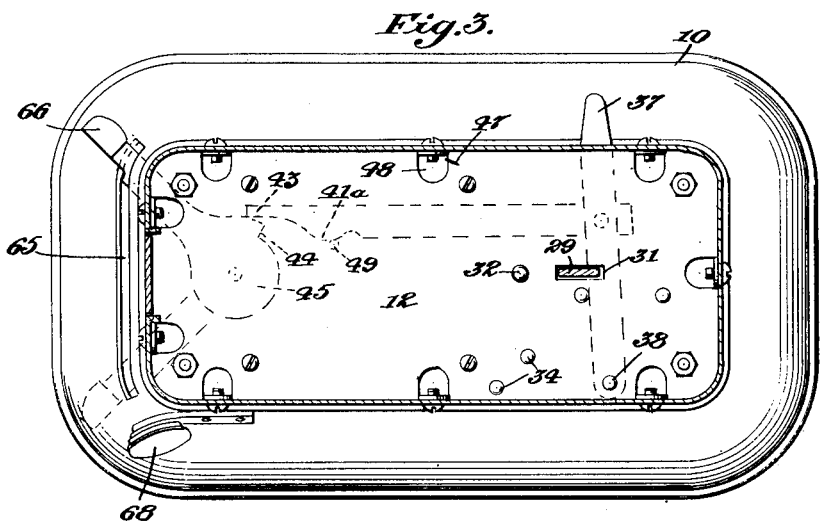

Oct. 17, 1933.     M. F. FITZGERALD     1,931,345
TIMED ELECTRIC TOASTER
Filed Sept. 17, 1930     3 Sheets-Sheet 2
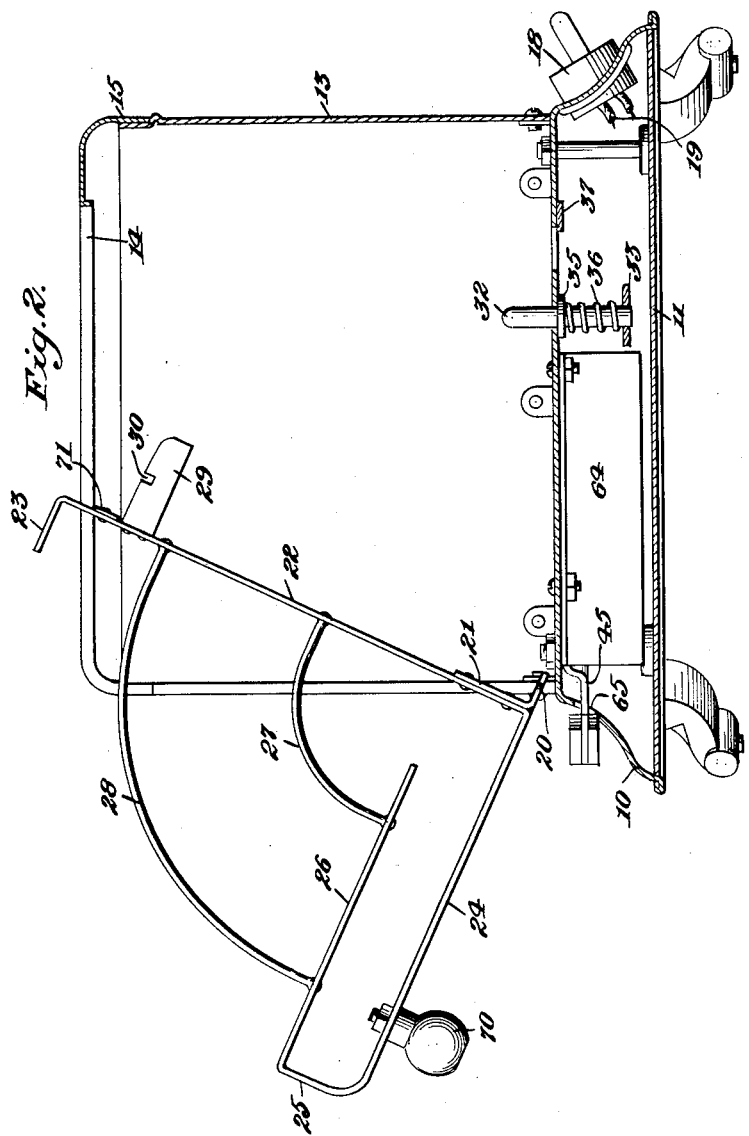
Inventor:
Maurice F. Fitzgerald,
by
Att'ys.

Oct. 17, 1933.　　　M. F. FITZGERALD　　　1,931,345
TIMED ELECTRIC TOASTER
Filed Sept. 17, 1930　　　3 Sheets-Sheet 3
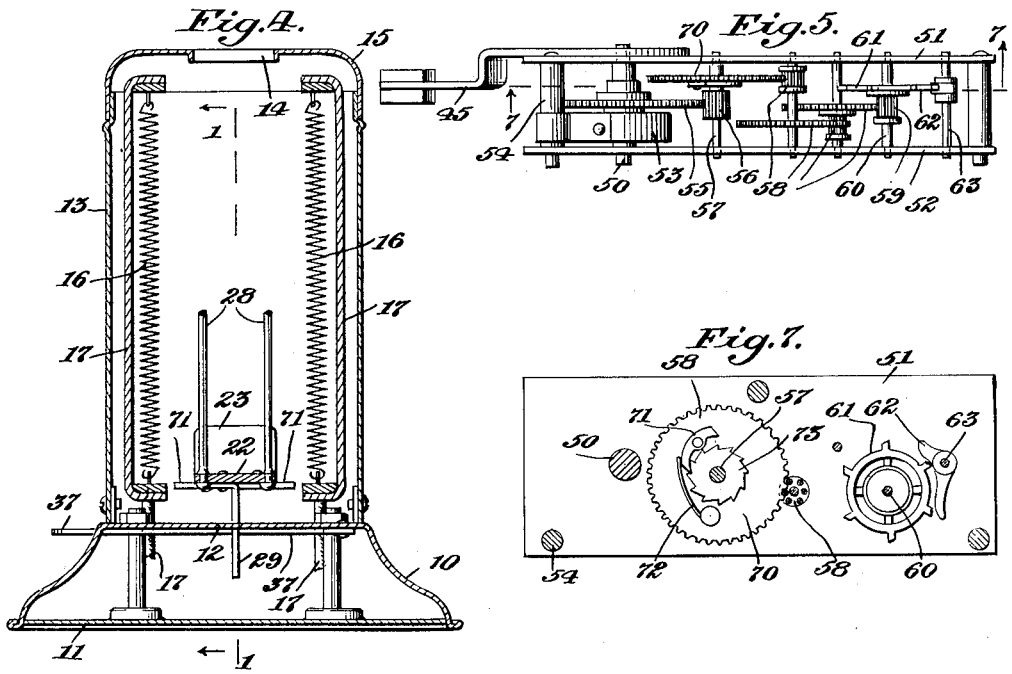
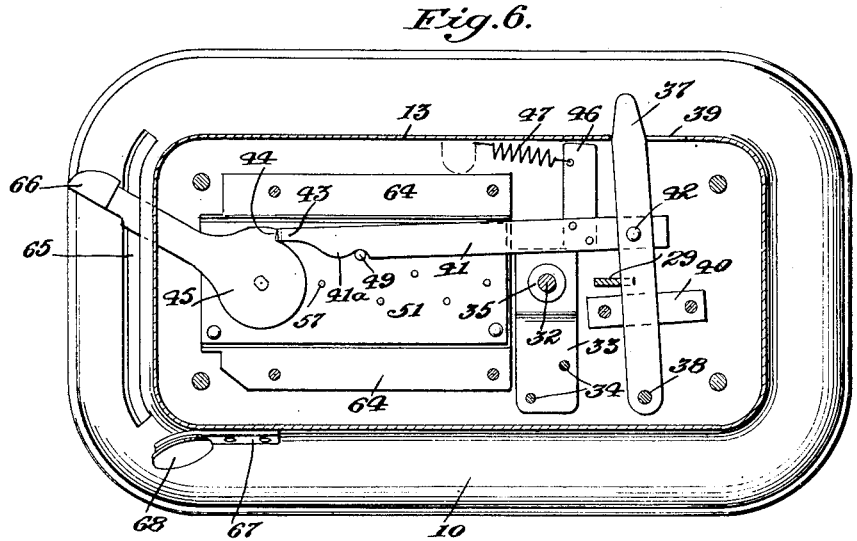
Inventor:
Maurice F. Fitzgerald,
by
Att'ys.

Patented Oct. 17, 1933

1,931,345

UNITED STATES PATENT OFFICE 1,931,345

TIMED ELECTRIC TOASTER

Maurice F. Fitzgerald, Winsted, Conn., assignor to The Fitzgerald Manufacturing Company, Torrington, Conn., a corporation of Connecticut Application September 17, 1930
Serial No. 482,597

4 Claims. (Cl. 53—5)

This invention relates to improvements in electric toasting devices, and more particularly concerns the provision of a device of this nature having means for removing the toast, when finished, from proximity to the heating elements.

One of the features of the present invention is the provision of a simple and compact structure for presenting the toast opposite the heating elements for a predetermined time, and thereafter removing it therefrom.

Another feature of the present invention is a timing device for controlling the toast holder structure and for effecting the movement of the same after a predetermined time interval.

With these and other objects in view as will appear in the course of the following specification and claims, an illustrative form of construction according to the invention is shown in the accompanying drawings, in which:

Figure 1 is a longitudinal sectional view substantially on line 1—1 of Figure 4.

Figure 2 is a similar view with the toast holder moved to a non-toasting position.

Figure 3 is a sectional view substantially on line 3—3 of Figure 1.

Figure 4 is a transverse vertical sectional view substantially on line 4—4 of Figure 1.

Figure 5 is a detail view of the timing mechanism, in side elevation.

Figure 6 is a horizontal sectional view substantially on line 6—6 of Figure 1.

Figure 7 is a sectional view of the timing mechanism substantially on line 7—7 of Figure 5.

In these drawings, a base 10 is closed at its bottom by a plate 11 and has a floor 12 formed rigidly therewith and constituting a part of the toasting oven. The side walls of this oven are formed by a casing 13 which has an opening at the left hand end in Figures 1 and 2, which is continued as a slot 14 in the top member 15 which is fitted rigidly to the casing 13. It will be understood that heating elements 16 (Fig. 4) are supported insulatedly on brackets such as 17 for heating the faces of the bread slices to produce the toast: but that these heating elements have been omitted from the remaining figures for greater clearness. An electrical connection 18 is provided for the conduction of the electric current into the apparatus to pass by wires 19 to the heater elements 17 in well known manner.

A pivot 20 is provided at the lower part of the casing 13, for supporting the clip 21 which is rigidly attached to the bread supporting member. This member comprises a strap 22 which is horizontal in the operating position of the bread supporting member (Fig. 1) and is provided with a short up-turned inner end 23 and a long up-turned outer end 24 which forms a closure for the aforesaid slot in the casing 13 when the bread holder is in toasting position. The upper end of the portion 24 is bent inward at 25 to conform with the shape of the top 15, and is then bent downwardly to afford a spaced bread guide 26 in substantially parallelism with the portion 24. Arcuately bent wires 27, 28 are connected to the strap 22 and to the guide 26 at each side of these members and themselves provide supports to prevent the contact of the slice of bread with the heater 16.

Rigidly connected to the strap 22 and extending downwardly therefrom is a dog 29 having a notch 30 therein. This dog may pass downwardly through a slot 31 in the floor 12. A plunger 32 is guided in an aperture of the floor 12 and in a bracket piece 33 attached to this floor 12 by the rivets 34. This plunger 32 has a collar 35 which is acted on by a coil spring 36 located between the collar and the bracket 33, so that it normally tends to swing the strap 22 upwardly and counter-clockwise from the position of Fig. 1 into that of Fig. 2.

The notch 30 of the dog 29 is engaged, when the toast holder is in toasting position, by the finger lever 37 which is mounted on a pivot 38 of the floor 12, and extends across the space between the floor 12 and the closing plate 11 and through a slot 39 in the side wall of the casing 13 (Fig. 6) so that it may be manually operated if desired. A guide piece 40 is secured to the floor 12 to support this lever in its proper position opposite the slot 30 of the dog 29.

A link 41 is connected by a pivot 42 to the finger lever 37 and extends toward the left in Figure 6 and presents its end 43 in position for engagement by the operating shoulder 44 of the timing lever 45. The link 41 has a rigidly connected laterally extending projection 46 engaged by a tension coil spring 47 which is connected at its other end to the frame work, for example, by being hooked around the edge of an aperture 48 in the floor 12 (Fig. 3.) This spring tends to draw the link 41 and therewith the finger lever 37 toward the left in Figure 6, and to hold the link 41 in engagement with the stop pin 49 at all times, except as it may be moved therefrom by the operation of the timing lever 45, as will be described hereinafter.

The timing train comprises a shaft 50 having a non-round end over which the timing lever 45 is fitted and extending through the plates 51, 52 of the timing mechanism. This shaft 50 is connected to the inner end of a spiral spring 53 whose outer end embraces a post 54 connecting the plates 51, 52. The shaft 50 also carries a gear 55 which meshes with a pinion 56, on the shaft 57: and by the other gear train comprising the gears and pinions 58 in Figure 5, a positive driving relationship is established with the pinion 59 on the escapement shaft 60 having the escapement wheel 61 thereon for engagement with the fly member 62 on the rock shaft 63. Such a timing train is old in its general assembly. In Figure 7 it will be seen that the shaft 57 has a ratchet wheel 73 fixed thereto, while the gear 70 carries a pall 71 to engage this ratchet wheel being held in engaging position by the spring 72.

The timing mechanism is preferably enclosed and protected by the guard member 64, which is secured to the floor 12. The link 41 is maintained between the fixed pin 49 and the adjacent wall of the guard 64. The timing lever 45 extends through a slot 65 in the base 10 (Figures 1, 2, 3 and 6) and has a knob 66 at its outer end which is preferably of material which is a poor conductor of heat. A clip 67 is likewise secured to the base 10 and is provided with a non-conductive button 68.

In operation with the parts in a position shown in Figure 2, a slice of bread is placed between the pairs of arcuate wires 27, 28 in an upright position, resting on the guide 26 and on the strap 22. It will be noted that the over-weighing of the portions 26, 24 is so great that the bread holder is held gravitationally in the position of Figure 2. When the bread has been inserted the knob 70 is pressed and raised so that the bread holder swings about its pivot 20 in a toasting position, until ultimately the strap 22 comes into contact with the plunger 32 and the dog enters the slot. A further movement is now given the knob 70 until the plunger 32 has been depressed sufficiently to lower the dog 29 to a position in which the finger lever 37 under the spring 47 will enter the notch 30 and thereby retain the bread holder in the position as shown in Figure 1. The thumb of the right hand, for example, may now be placed on the knob 66 and the forefinger on the button 68, and by squeezing the fingers together the timing lever 45 is rocked and therewith the shaft 50 is turned. Thus the spring 53 is wound up. During the movement of the timing lever, counter-clockwise in Figure 6, the end 43 of the link 41 slips down the shoulder 44 from the position shown in Figure 3 into the position shown in Figure 6.

When the knob 66 is released, the spring 53 tends to rotate the shaft 50 in the reverse direction and to carry the timing lever 45 back in a clockwise direction into its initial position as shown in Figure 3. This movement, however, is retarded and regulated by the action of the timing train of Figure 5, so that a predetermined time interval elapses before the timing lever 45 regains the original position. During this movement the shoulder 44 ultimately engages the end 43 of the link 41 and moves this link toward the right in Figure 6, thus rocking the finger lever 37 until it passes out of the notch 30 and thus disengages the dog 29. The plunger 32 now operates under the action of its spring 36 to project the bread holder in a counter-clockwise direction about its pivot 20 into the position shown in Figure 2, where the toast has been removed from toasting position.

As the timing lever 45 continues to move beyond the position in Figure 6 during its return, it not only causes release of the finger lever 37 from its detaining position in the notch 30, but it also causes the cam portion 41a of the link 41 to move along the fixed strike pin 49 so that the link 41 is rocked in a clockwise direction about its pivot 42 until the end 43 is moved out of the path of the shoulder 44. The link 41 is then pulled toward the left in Figure 6 by the spring 47, until its movement is stopped by the engagement of finger lever 37 with the end of its slot 39. The finger lever 37 is now in position to re-engage the dog 29 when the bread holder is again pushed into the toasting position. It will be noted that the lateral rocking movement of the link 41 is limited on the one hand by the fixed pin 49 and on the other hand by the operation of the spring 47 and by the wall of the guard 64.

It will be noted that the toast holder may be unlocked from toasting position at any time by a manually prepared finger lever 37 in a clockwise direction (Fig. 6) about its pivot 38.

It is obvious that the invention is not limited to the form of construction, but that it may be employed in many ways within the scope of the appended claims.

What is claimed as new and is desired to be secured by Letters Patent is:

1. In a toaster, a frame having a floor, fixed side and rear walls on said frame for defining a toasting oven, heating elements in said oven, a bread holder constituting a front wall for said oven and including a member which is substantially horizontal when the holder is in toasting position, a pivot on said frame for supporting said holder so that it may swing into and out of toasting position, a dog on said holder adapted to pass through said floor, a manually releasable detent located beneath said floor and pivotally mounted thereon and engageable with said dog to maintain said holder in toasting position, a spring located beneath said floor, and means operated by the spring for moving said holder out of toasting position upon release of said detent.

2. In a toasting device, a frame, a bread holder pivotally mounted on said frame, means for causing the holder to move from toasting toward non-toasting position, a detent lever for maintaining the holder in toasting position, a timing train, a winding lever for energizing said train, said train returning the lever gradually to the initial position, a shoulder on said winding lever, and a link pivotally connected to said detent lever and having its end normally in the path of said shoulder so that the shoulder on said winding lever may move said link in the direction of its length and thereby actuate said detent lever to release the bread holder, a cam member and a cam cooperating member, one of said members being fixed to the frame and the other located on the link whereby the link is rocked about its pivot when the lever is in the releasing position so that the link is moved out of the path of said shoulder and may be returned with the detent lever into position for re-engagement of the holder.

3. In a toasting device, a frame, a bread holder pivotally mounted on said frame, means for causing the holder to move from toasting toward non-toasting position, a detent for maintaining the holder in toasting position, a timing train, a winding lever for energizing said train, said train returning the lever gradually to the initial position, a shoulder on said winding lever, and means actuated by the shoulder after a predetermined movement of the winding lever to release said detent from said holder including a link to be engaged by said shoulder and thereby moved in the direction of its length, said link thereupon operating on the detent to release the same, a cam member and a cam cooperating member, one of said members being fixed to the frame and the other mounted on the link whereby to cause the link to move laterally out of the path of the shoulder after the detent has been released, and a spring connected to said link and to the frame to move the link and detent into maintaining position and to hold said link against said pin.

4. In a toaster, a toasting oven having a slot in one of its vertical walls, and a bread holder mounted on a horizontal axis located adjacent the bottom of said slot, said toast holder having a wall which is substantially vertical when in the toasting position for closing said slot and a portion at a right angle thereto for holding the bread slice, said toast holder also having a wall substantially parallel to but spaced from said first vertical wall to maintain the slice in spaced relation from said first vertical wall.

MAURICE F. FITZGERALD.